April 17, 1934.  G. J. OLNEY  1,954,944
CAN SEPARATING AND FEEDING MACHINE
Filed Sept. 15, 1931  4 Sheets-Sheet 1

INVENTOR
George J. Olney
BY Martin & Rendell
ATTORNEYS

April 17, 1934.   G. J. OLNEY   1,954,944
CAN SEPARATING AND FEEDING MACHINE
Filed Sept. 15, 1931   4 Sheets-Sheet 3

INVENTOR
George J. Olney
BY Martin & Rendell
ATTORNEYS

April 17, 1934.　　　　G. J. OLNEY　　　　1,954,944

CAN SEPARATING AND FEEDING MACHINE

Filed Sept. 15, 1931　　　4 Sheets-Sheet 4

INVENTOR
George J. Olney
BY Martin & Rendell
ATTORNEYS

Patented Apr. 17, 1934

1,954,944

UNITED STATES PATENT OFFICE 1,954,944

CAN SEPARATING AND FEEDING MACHINE

George J. Olney, Westernville, N. Y.

Application September 15, 1931, Serial No. 562,910

4 Claims. (Cl. 198—30)

My present invention relates to a can-handling machine and particularly to a machine especially adapted to separate and re-arrange such cans.

Recently in the food-canning industry canned food has come to be very largely put up in small-sized cans commonly known as "ten-cent cans" as distinct from the larger or quart cans commonly used heretofore. As the smaller cans contain only about one-third as much as the larger cans the different machinery used in the canning plants has to be speeded up to run about three times as fast as heretofore in order to obtain the same production. Heretofore after the cans have been filled and cooked they were removed by hand from their temporary containers and placed into a chute which conveyed the cans to the can-labeling machine. Under the new practice this step cannot be satisfactorily duplicated by hand work because the labeling machine must be set to run about three times as fast as heretofore and the small-sized cans on account of fitting so much closer together cannot be handled as quickly as the large sized cans and it is out of the question to handle them three times as fast as the larger cans. A further difficulty in this step is that the temporary boxes or crates holding the small cans practically always have the cans arranged two layers deep and with usually twenty-four cans in each layer, generally four rows of six cans each. The cans in the lower layer are particularly difficult to remove quickly by hand. The fact that the small sized cans are in these two layers renders unadaptable for use previous devices sometimes used for transferring cans arranged in one layer in a container to a chute or labeling machine requiring the cans to come in one row.

The purpose of this invention is to provide an apparatus or machine for transferring the cans from a temporary container having two layers of cans one on top of the other and re-arranging them into a single row with the cans side by side, that is with their longitudinal axis crosswise of the row; and to provide in such a device means for quickly transferring the cans from the temporary containers to a part of the machine from which they can be moved so as to ultimately get them in the changed relative position and particularly into one row.

A further purpose is to provide a machine of the character described which is simple in construction, effective in operation and not liable to get out of order or become chocked through the cans becoming disarranged or not being handled regularly.

Further purposes and advantages will appear from the specification and claims herein.

Fig. 7 is a horizontal sectional view through the cam wheel and connected mechanism for operating the can-moving plunger 61.

Figs. 8 and 9 are respectively side elevations of the inner bar 65 and the cam plunger bar 64.

Figure 2:
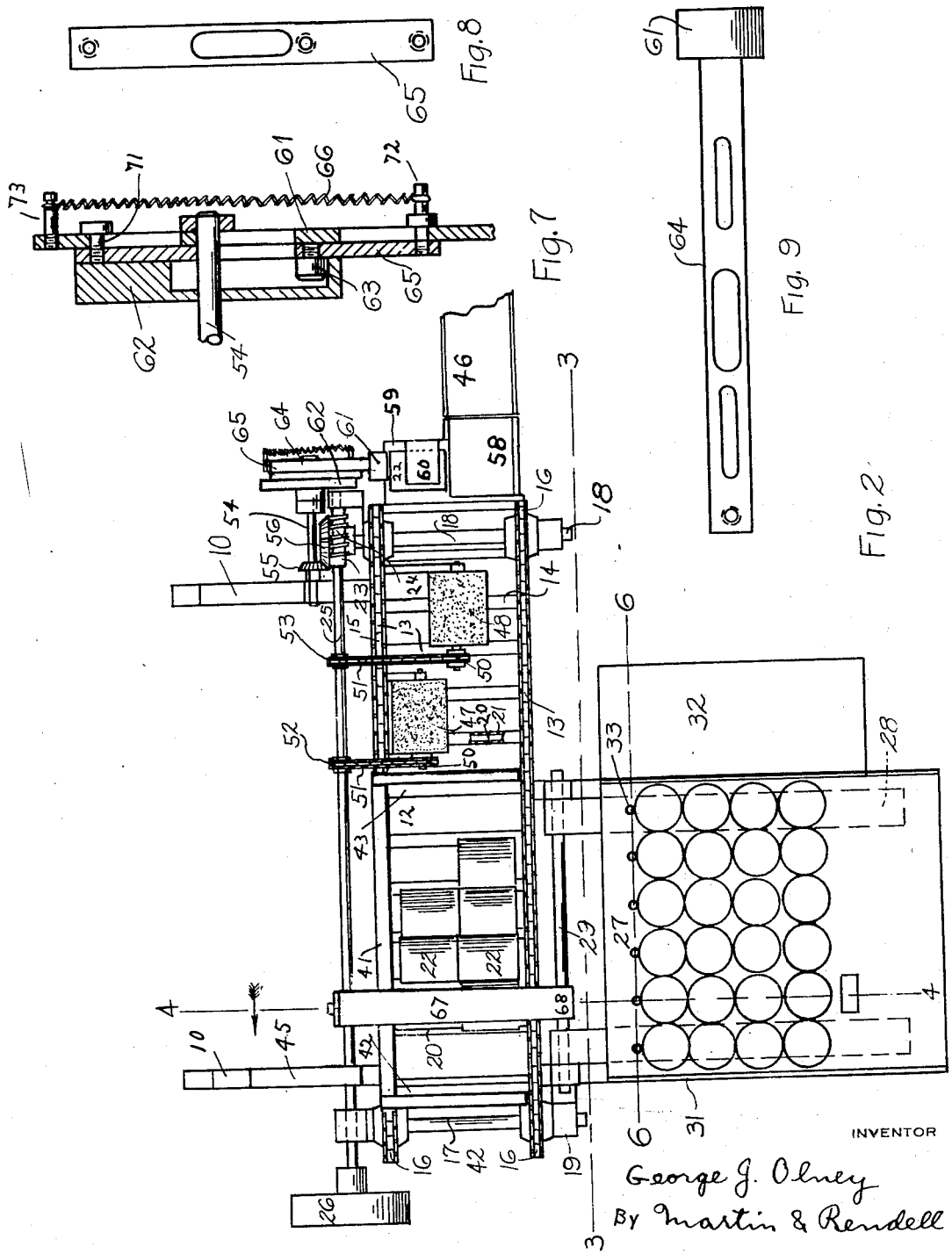
Fig. 2 is a top plan view of a machine embodying my invention.
Figure 3:
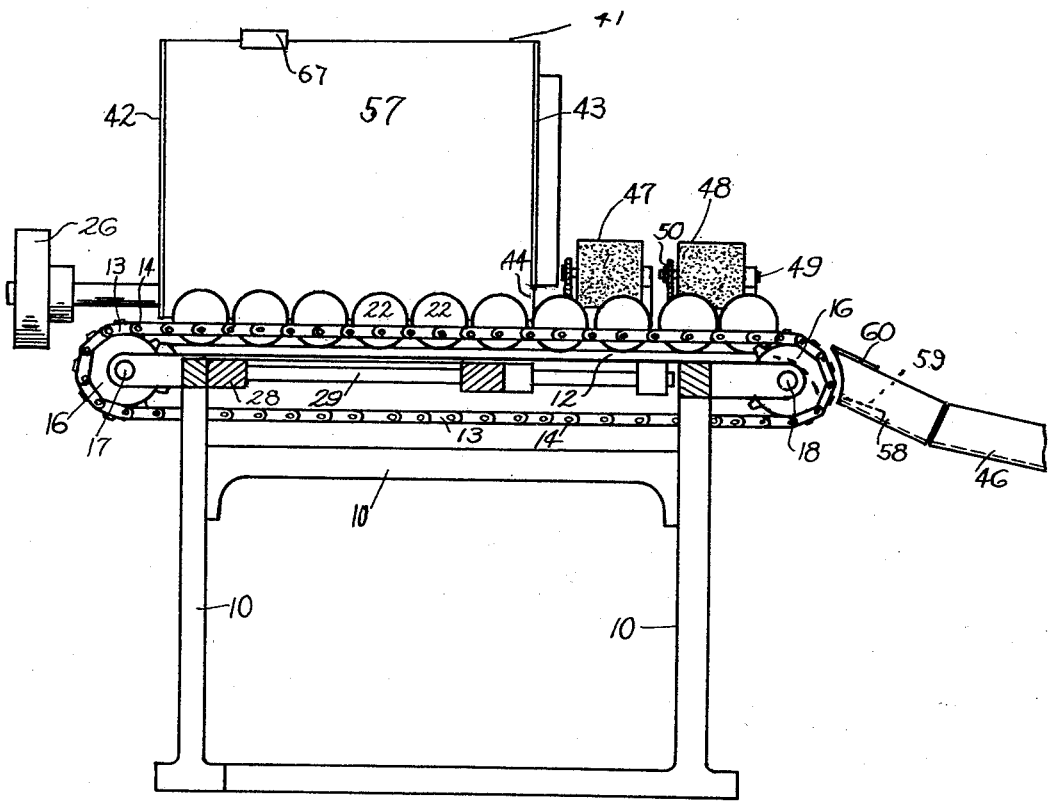
Fig. 3 is a front side view of the machine, with part of the movable platform removed on line 3—3 of Fig. 2.

Referring to the drawings in a more particular description it will be seen that the machine comprises an irregularly-shaped frame 10 of suitable material and construction towards the upper part of which are provided horizontal supports 11. Upon these spaced supports 11 is fixed a table 12. Extending for the full length of this table there is provided an endless conveyor 13 consisting of cross bars 14 mounted upon spaced chains 15 which in turn are carried by spaced sprocket wheels 16 mounted upon a shaft 17 at the left end of the table as seen in Figs. 2 and 3 and a shaft 18 mounted at the right hand end of the table. Said shafts are mounted in suitable bearings 19 provided upon the frame 10.

The cross bars 14 are preferably formed of a rod 20 rigidly connected at its ends to the opposite chains 15 and carrying a tubular member 21 rotatably mounted on the said rod. This arrangement gives a better and easier contact against the sides of the cans 22 so that the cans are not marred or damaged and so that there is really a yielding push given to the cans rather than a positive push the purpose of which will be explained hereinafter.

The arrangement and driving of the conveyor 13 is such that the upper length of the conveyor, that is its portion on top of the table 12 will move to the right as the machine is seen in Figs. 2 and 3. The endless conveyor is driven by power through the rear end of the right hand shaft 18 being provided with a worm gear 23 which is in mesh with a worm 24 on a shaft 25 mounted in suitable bearings upon the frame. As shown in the drawings this shaft extends to the left end of the machine and is there provided with a pulley 26 to be driven from the source of power by a belt not shown. It will be understood that the sprocket wheels 16 are fixed to the said shaft 18.

Figure 5:
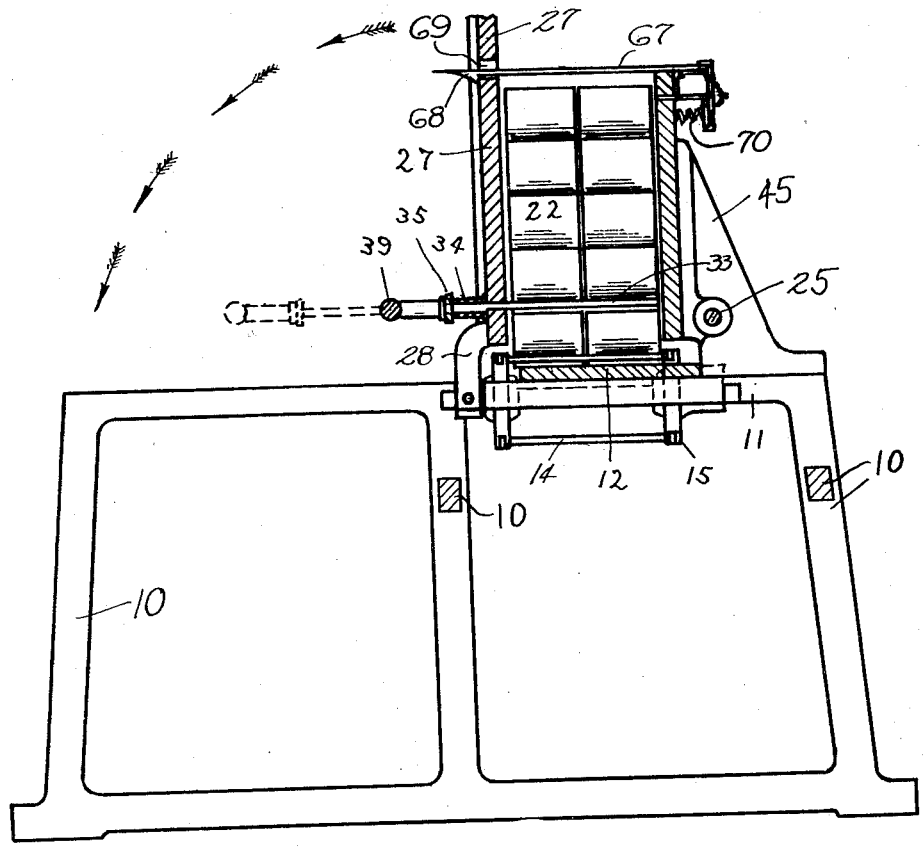
Fig. 5 is a view similar to part of Fig. 4, but with the movable platform raised to upstanding position showing the cans that were on the platform transferred into the box over the table, but still supported above the lowermost layer of cans upon the table by the fingers provided therefor. In dotted lines in this figure there is shown the retracted position of these fingers.
Figure 1:
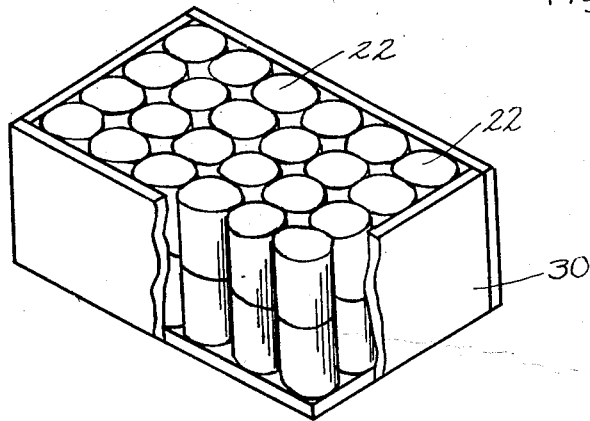
Fig. 1 is a perspective view of a box in which the small cans in two layers are stored before coming to the machine herein described, part of the box being broken away to more clearly show the arrangement of the cans therein.
Figure 4:
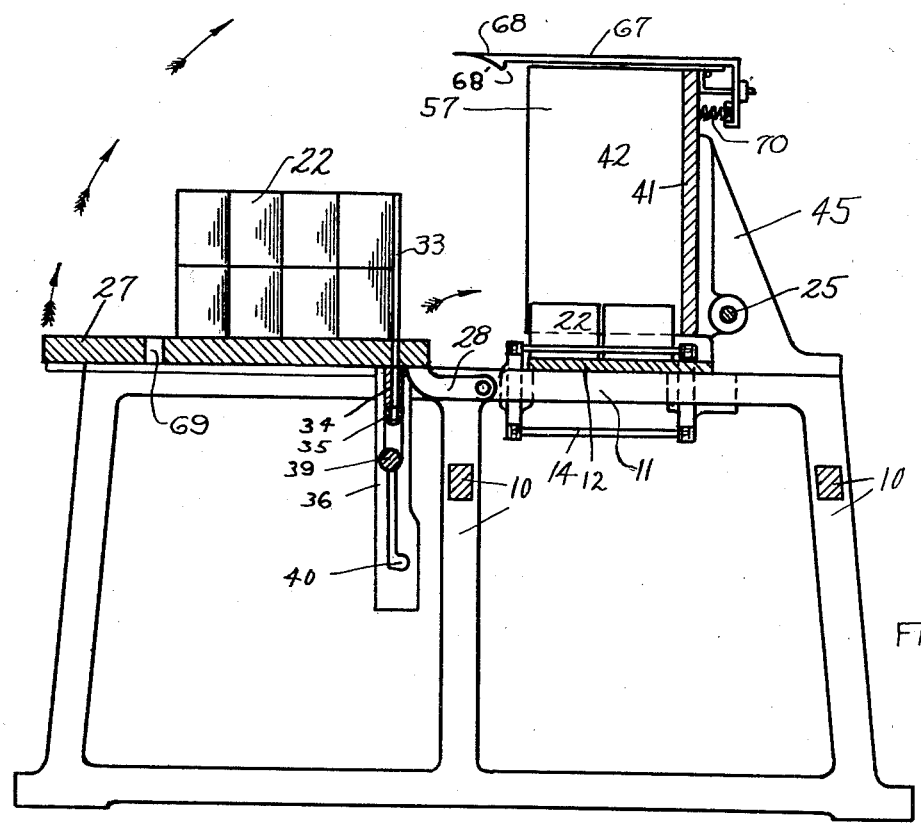
Fig. 4 is a transverse vertical sectional view of said machine on line 4—4 of Fig. 2 with the movable platform in horizontal position with cans thereon.
Figure 6:
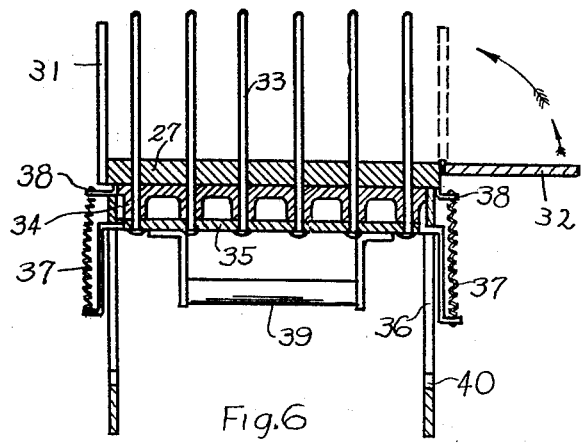
Fig. 6 is a vertical sectional view on line 6—6 of Fig. 2 particularly showing the means for retracting the can-supporting fingers.

Closely in front of the left end of the table as shown in Figs. 2 and 3 there is provided a movable platform 27. The rear of this platform is hingedly or swingingly connected to the machine as by hinged straps 28 connected to a hinge rod 29 mounted in the forward ends of two of the frame supports 11 so that the platform may be swung from its horizontal position as shown in Fig. 4 to upright or vertical position as shown in Fig. 5. The platform is large enough to have placed thereon the entire contents of one of the storage boxes 30 which as already mentioned normally contains forty-eight cans 22 arranged in two horizontal layers, twenty-four to each layer. The operator transfers the contents of one of these boxes to the horizontally arranged platform 27 by quickly turning the box 30 upside down over the platform 27 and bringing the open top of the box down close to the said platform so that the cans will by gravity then drop or slide out of the box while the box is at once removed from the cans but leaving the cans arranged as already mentioned in two horizontal layers. The box 30 is shown as having each layer composed of four rows of cans with six cans in each row and the machine is shown as adapted to handle this arrangement of cans. It will be obvious, however, that the machine may be readily adapted or built to accommodate larger or smaller boxes and with the cans arranged in a different number of rows or with a different number of cans to the row. The platform 27 is provided with an upstanding side 31 at its left hand side to aid in keeping the cans properly placed upon the platform when the cans are first placed there and also when the platform is raised as hereinafter mentioned. For a similar purpose the right hand side of the platform is also provided with a movable side or wing 32. For convenience in placing the contents of a storage box upon the platform this wing is normally down or level with the platform itself as shown in Figs. 2 and 6. After the cans have been so placed upon the platform and the storage box removed therefrom this wing is raised ninety degrees through its left hand edge being hingedly mounted relative to the adjacent side of the platform.

Spaced forward a short distance from the rear edge of the platform 27 there is provided a row of upstanding fingers 33, said fingers being six in number and arranged to be opposite the center of the cans in the farthest row upon the platform. During the transferring of the cans to the platform from the box 30 and during the raising of the platform 27 with its load of forty-eight cans to the position shown in Fig. 5 these fingers 33 project from the working face of the platform that is they are upright when the platform is horizontal as shown in Figs. 2 and 4, but are horizontal and extend to the rear from the platform when the platform is in vertical position as shown in Fig. 5. These fingers it will be seen form a fence as it were to aid in keeping the cans in proper position when the platform is horizontal and hold the cans from sliding down from the platform when the platform is raised to vertical position over the conveyor and over the table as shown in Fig. 5.

Fig. 6 which is a vertical sectional view on line 6—6 of Fig. 2 particularly shows the construction of these fingers 33 and the means for operating them in unison when desired. It will be seen from this that adjacent each finger there is provided below the platform 27 a deep downwardly extending socket 34 in which is slidingly mounted the lower end of a finger. Said sockets are secured to the underside of the platform. The lower ends of the fingers project from the lower end of the said sockets and are there secured to a cross bar 35 the opposite ends of which are slidingly mounted in a slot in a guide 36. Each end of the cross bar projects beyond said guide and is there connected to the lower end of a coil spring 37 the other and upper end of which is connected to a bracket or hook 38 near the platform. In this way the fingers are yieldingly held in upper or projecting position as shown in Fig. 6, but may be retracted by the operator temporarily overcoming the tension of the springs 37 by grasping the handle 39 provided upon the lower side of the cross bar 35. The length of the guides 36 and the slots therein is such as to allow the operator to draw the fingers entirely back into the sockets 34 so that their ends will not project beyond the working face of the platform 27. As shown in Fig. 4 which shows a side view of one of the guides 36, the end of the slot farthest from the platform is provided with a notch 40 into which the ends of the cross bar may be placed so as to hold the fingers retracted against the tension of the springs 37.

In order to properly locate and confine the set of forty-eight cans when they are moved into position over the conveyor and the table, there is provided opposite the platform an open bottomed agitation box 57 which is also open at the front so as to receive the cans from the platform 27. The box accordingly consists of the upstanding back 41, a left hand end 42 and a right hand end 43. The right hand end does not reach down to the level of the conveyor, but stops a distance above the table slightly greater than the diameter of the can thus leaving an outlet 44 at that end of the box for the cans to be moved out of the box by the conveyor. It will be understood that when the platform 27 is raised into vertical position the fixed side 31 of the platform will pass just inside of the left hand end 42 of the box and the movable wing 32 of the platform will pass just inside the right hand end of the box. As shown in Figs. 4 and 5 a strong upstanding bracket 45 is provided upon the frame 10 to hold the back 41 and also the ends 42 and 43 of the box formed thereby over the endless conveyor.

The operation of the machine so far described is that after the conveyor has transferred all but some of the cans in the lowermost horizontal rows from the box the operator, having already placed a set of cans on the platform and removed the box thereover and having raised the wing 32 to upright position, quickly swings the platform 27 to vertical position carrying therewith the two layers of cans 22. The fingers 33 prevent the cans from sliding down relative to the now upstanding platform 27 until the entire set of cans are safely housed in the box over the table, then the operator retracts the fingers 33 and locks the said fingers in retracted position. The cans now added to the cans already in the box over the table descend as far as may be, that is descend wherever there are vacancies in the vertical rows of cans. The continued operation of the conveyor then successively advances the cans out from the box through the outlet 44. As already suggested the cans are to a large degree yieldingly pushed by the cross bars of the conveyor and there is considerable churning about and agitating of the cans to determine which cans shall make their way out through the outlet, the general process, however, being for the cans in the upper rows to finally push their way to the lower spaces as soon as any of those spaces have become vacant. It will be understood of course that so far as the machine so far described is concerned the cans will emerge in two rows from the agitation box and between the cross bars of the conveyor and that the cans will now be horizontally arranged with the two cans end to end and with the cans in adjacent rows parallel. As the agitation box formed by the back 41 and ends 42 and 43 becomes partly emptied the operator swings the platform 27 back from upright position to horizontal position and at the same time releases the fingers so that they may advance to upward position. The contents of the next storage box 30 is then placed upon the platform and the cans are ready for the next transferring operation of the platform 27.

As the cans are thus moved out from the box through the outlet 44 they continue to be pushed along the right hand end of the table 12 by the cross bars 14 of the conveyor 13. Normally ahead of each cross bar there are two cans arranged end to end or in other words, the cans are now progressing to the right in two horizontal rows. I will now describe the mechanism used to transfer these two rows of cans into one row as required by the ordinary chute or conveyor guide-way 46 leading to the can-labeling device not shown. As the machine here shown is organized the chute 46 leading to the labeling machine is located opposite the forward or near row of the two rows of cans that are being pushed to the right across the right hand end of the table 12. Preferably two separate mechanisms are used to accomplish the transfer of the cans from the farther or rearward row into the front row.

The first mechanism of these two devices consists of a set of brushes 47 and 48 horizontally arranged and having their axes longitudinally arranged relative to the length of the table 12. One brush 47 is arranged about over the rear row of cans on this portion of the table close to the outlet 44. The brush is mounted on a shaft 49 supported in suitable brackets so as to have the bristles of the brush engage the upper portion of the cans in said rear row. Another brush 48 of similar form is provided farther to the right and midway of the width of the table. Each brush is rotated by means of a small sprocket wheel 50 mounted upon said brush being engaged by a sprocket chain 51. The rear ends of these chains extend over separate spaced sprocket wheels 52 and 53 respectively mounted upon the main shaft 25 provided at the rear of the machine. Another shaft 54 is horizontally mounted in suitable bearings and is provided with a bevel gear 55 which engages a bevel gear 56 mounted upon the rear end of the driven shaft 18 already mentioned as moving the conveyor 13. The purpose and operation of these brushes 47 and 48 is to yieldingly push forward the cans in the rear row. This yielding tension from the brushes is inoperative if there is already in front of any given cross bar 14 a can in the front row. It often happens, however, that there is no can in the front row due to irregularity of action in the agitation box 57 or due to delay in the operator transferring a new supply of cans into said agitation box. If there is a can in the rear row and no can in the front row the first brush 47 pushes the can part way into the front row and then the second brush 48 completes the movement of this can into the front row.

Under normal conditions, however, the cans emerge from the agitation box 57 in two continuous rows and a second and separate device is provided to positively accomplish the transfer of the cans in the rear row into the line of the forward row. Opposite the right hand end of the conveyor 13 there is provided a platform 58, slanting sharply downward as it extends further to the right and connects with the chute or conveyor 46 leading to the labeling machine. As the cans from the front row are moved by the conveyor 13 out onto this platform the momentum already given the can and the sharp pitch of the platform 58 cause the cans in this front row to quickly slide or roll to the right into the chute 46. The platform 59 at the right end of the conveyor 13 opposite the rear row of cans slants downwardly but not so sharply and each can coming onto this platform from the conveyor is temporarily and partly restrained by a light spring 60 engaging the upper side of the can. Due to the more gentle slope and the yielding tension from this spring, the can in the rear row is temporarily held while the can in the front row and directly opposite said rear can rolls or slides from the front platform 58. Then the can in the rear row is pushed endwise or forwardly from the platform 59 onto the platform 58 whereupon this can quickly slides or rolls down the said platform 58 into the chute 46 and so completes its transfer into the front row. The can in the rear row is pushed from the platform 59 onto the platform 58 by the forward end of a plunger 61 suitably mounted for longitudinal movement and reciprocated in such direction by being suitably co-operatively connected to a cam wheel 62 driven from a common suitable source of power and conveniently mounted for that purpose upon the right hand end of the shaft 54. It will be understood that the movement of the plunger is so timed and speeded as to obtain a forward motion promptly after a can in the front row has had time to move from its position opposite the can in the back row opposite said plunger and that the speed of said plunger is sufficient to move the can into the front row before the next can from the front row is delivered onto the platform 58 by the main chain conveyor 13.

As seen in Figs. 7, 8 and 9 this mechanism includes the cam wheel 62 having a cam groove engaged by cam roller 63 mounted on the inner bar 65 which carries pins 71 and 72 engaging spaced slots in the plunger bar 64 carrying at its forward end the plunger 61. The pin 72 being towards the plunger end of bar 64 has attached to its outward end a contractile coiled spring 66 secured at its rear end to an arm 73 fastened to the rear end of the plunger bar. The mechanism is so arranged as to give the required quick advance of the plunger at the required time and also so as to promptly thereafter give a quick return of the plunger.

The platform 27 is detachably held in raised position as seen in Fig. 5 by a spring-mounted catch strap 67 hingedly mounted to the back 41 of the agitation box 57 and normally but yieldingly held in the position shown by spring 70. The slanting lower side of the front end 68 of the strap engages with an obvious camming action the edge of the platform 27 at the bottom of hole 69 in said platform and so automatically raises the strap as the said platform is thrown up and the shoulder 68' at the back of the point 68 then springs down and positively holds the platform in raised position. When the platform is to be lowered, the operator manually raises the forwardly projecting end 68 of the strap enough to disengage the shoulder 68'.

What I claim as new and desire to secure by Letters Patent is:

1. In a can separating and feeding machine, the combination of a table, an endless conveyor having spaced crossbars extending crosswise of said table and adapted to move longitudinally of the table, a bottomless box supported over one end of said table and of said conveyer and having an open side above one side of the table and having at the delivery end of said box an opening immediately above the conveyer high enough to let only the bottom cans pass therethrough and a movable platform having one edge hingedly mounted near the lower part of the open side of said box and being adapted when horizontal to have placed thereon cans on end and two layers deep and adapted to be swung upwardly into the open side of said box and thereby carry said cans thereinto on their sides still end to end in two vertical layers.

2. In a can separating and feeding machine the combination of a table, an endless conveyer having spaced crossbars extending crosswise of said table and adapted to move longitudinally of the table, a bottomless box supported over one end of said table and of said conveyer and having an open side above one side of the table and having at the delivery end of said box an opening immediately above the conveyer high enough to let only the bottom cans pass therethrough, a movable platform having one edge hingedly mounted near the lower part of the open side of said box and being adapted when horizontal to have placed thereon cans on end and two layers deep, and adapted to be swung upwardly into the open side of said box and thereby carry said cans thereinto on their sides still end to end in two vertical layers, retractable fingers normally extending upward through said platform in a row spaced from the hinged edge of the platform to hold the cans upward above the lower layer of cans in the open box when said platform is swung upwardly and means for withdrawing said fingers from below the cans carried by the platform when the platform has been raised.

3. In a can separating and feeding machine, the combination of a table, an endless conveyer having spaced crossbars extending crosswise of said table and adapted to move longitudinally of the table, a bottomless box supported over one end of said table and of said conveyer and having an open side above one side of the table and having at the delivery end of said box an opening immediately above the conveyer high enough to let only the bottom cans pass therethrough and a movable platform having one edge hingedly mounted near the lower part of the open side of said box and being adapted when horizontal to have placed thereon cans on end and adapted to be swung upwardly into the open side of said box and thereby carry said cans thereinto on their sides.

4. In a can separating and feeding machine the combination of a table, an endless conveyer having spaced crossbars extending crosswise of said table and adapted to move longitudinally of the table, a bottomless box supported over one end of said table and of said conveyer and having an open side above one side of the table and having at the delivery end of said box an opening immediately above the conveyer high enough to let only the bottom cans pass therethrough, a movable platform having one edge hingedly mounted near the lower part of the open side of said box and being adapted when horizontal to have placed thereon cans on end and adapted to be swung upwardly into the open side of said box and thereby carry said cans thereinto on their sides, retractable fingers normally extending upward through said platform in a row spaced from the hinged edge of the platform to hold the cans upward above the lower layer of cans in the open box when said platform is swung upwardly and means for withdrawing said fingers from below the cans carried by the platform when the platform has been raised.

GEORGE J. OLNEY.